Patented June 21, 1927.

UNITED STATES PATENT OFFICE.

ADOLPH G. HUPFEL, JR., AND THOMAS M. RECTOR, OF NEW YORK, N. Y., ASSIGNORS, BY DIRECT AND MESNE ASSIGNMENTS, TO HELLMAN-HUPFEL, INC., OF NEW YORK, N. Y., A CORPORATION OF NEW YORK.

MUSHROOM PASTE.

No Drawing.   Application filed May 2, 1922.   Serial No. 557,970.

This invention relates to certain improvements in food products.

It is the especial object of the invention to produce a prepared food product consisting of fresh mushrooms, disintegrated, crushed or ground up and prepared so that the natural flavor and aroma of the fresh mushroom is retained in the product, and so that the product may be kept for considerable periods without losing its flavor and aroma, and which also will have the natural color of the crushed mushrooms, this product being utilized in culinary products in place of whole raw mushrooms, so that any dish requiring a mushroom flavor may be very quickly and easily prepared.

It is a further object of the invention to provide an improved process or method for treating and preserving the mushrooms so that their natural flavor, aroma and color will be retained in the product for considerable periods.

The finished product will preferably be in the form of a paste in which the natural juices of the mushroom are present, the retention of these juices aiding in forming the crushed mushrooms into a paste having the desired flavor, aroma and color.

In producing this improved product we may proceed as follows:—

Whole fresh mushrooms including the stems are first washed to remove dirt, the mushrooms being preferably used as soon as possible after they have been picked. These mushrooms in the raw condition retaining their natural juices are then crushed or pulped in any suitable pulping or crushing apparatus, this crushing reducing the mushrooms to what may be termed a pulp, the mushrooms being broken up or crushed into small pieces. Where the final product is to be in the form of a paste, this rough pulp is then further crushed or disintegrated to form the paste, and to effect this the pulp is passed through a machine which will reduce the product of the first crushing to a paste. This may be effected by forcing the pulp through a very fine mesh screen in any suitable manner, water being added when necessary in sufficient quantities to produce the paste. The natural juices of the mushrooms are however, retained so that this paste has the flavor and aroma of the fresh mushrooms, the natural juices aiding to some extent in the formation of the paste.

This paste is processed so that it will not readily decompose or oxidize and is preferably treated with a preservative which will act to keep the paste fresh for considerable periods and cause it to retain its flavor and aroma. This preservative may be of any desired character, but in the best practice of the invention a good grade of common salt will be employed, this salt being added to and well mixed with the paste. Salt is used in preference to other preservatives such as benzoate of soda or the like, as salt has a peculiar effect in bringing out the flavor of the mushroom when the paste is employed in cooking. The amount of salt used may, of course, be varied as desired, but in actual practice good results have been obtained by the employment of about 15% by weight.

This paste, as thus prepared, may in some instances, be too thin for convenient packaging, and we also may add to the paste some thickening agent which will give the paste a body, this thickening agent being one which will not affect the flavor of the paste. Starch or flour is effective for this purpose, and the starch or other thickening may be added to the desired amount, about 10% by weight having been found to give a paste having a good body.

Mushrooms when broken up are very readily affected by oxidation, the effect of which is to cause the mushrooms to assume a blackish appearance. We have found that by adding a little evaporated milk or the like, say 5% by weight, the paste will tend to keep the natural gray color of the crushed mushroom for considerable periods. This milk addition also adds more body and food value to the product and will preferably be used, though if desired under some circumstances may be omitted.

The product is then slightly heated, say to a temperature of 150° F. the purpose of this being to drive off any contained air which might cause undesirable oxidation, the heat, however, not being sufficient to cook the product or to destroy its flavor or aroma. This heating may be conveniently done in a closed jacketed kettle which may be equipped with an agitator, and preferably while this heating operation is taking place, the paste is subjected to the action of a vacuum pump, suitably connected with the kettle, to assist in removing any dissolved or occluded air.

The product thus prepared is then sealed, preferably hermetically, in cans, jars, or the like, and this packaging of the product may be effected in a substantially non-oxidizing atmosphere, such as $CO_2$ gas or other neutral agent which will prevent oxidation and discoloration of the product during the packaging operation, or, if desired, the product may be packed in a vacuum.

Under some circumstances the addition of salt or other preservative may be omitted and the preserving of the product may be effected by sterilizing the packed product at ordinary sterilizing temperatures, though as before stated, the addition of a preservative is preferred.

The product prepared as described may be used in culinary operations in place of fresh mushrooms, thus saving considerable time in preparation of dishes, and the product can be kept for considerable periods without deterioration as to flavor, aroma or color.

It will be understood that the word "paste" as used in the claims will include a pulp of raw mushrooms formed by crushing or disintegrating the mushrooms into comparatively small particles, and that this pulp may be subjected to further operations to produce a mass which shall be within the meaning of this word.

What we claim is:

1. A prepared food product comprising a paste of raw mushrooms in which the natural juices are retained and which is characterized by the flavor and aroma of fresh mushrooms, a preservative, and a thickening agent.

2. A mushroom paste comprising raw crushed mushrooms containing the natural juices, salt, and a thickening agent.

3. A mushroom paste comprising raw crushed mushrooms containing the natural juices, salt and starch.

4. A mushroom paste comprising raw crushed mushrooms containing the natural juices, salt, a thickening agent and evaporated milk.

In testimony whereof, we have hereunto set our hands.

ADOLPH G. HUPFEL, Jr.
THOMAS M. RECTOR.